United States Patent [19]

Chen

[11] Patent Number: 4,773,521

[45] Date of Patent: Sep. 27, 1988

[54] COMPACT PORTABLE CONVEYOR

[76] Inventor: Ming-Chin Chen, No. 24, Hsin Chang Street, Duo Lio City, Yunlin Hsien, Taiwan

[21] Appl. No.: 77,015

[22] Filed: Jul. 23, 1987

[51] Int. Cl.⁴ ............................................. B65G 41/00
[52] U.S. Cl. ................................. 198/302; 198/860.3; 198/632; 198/735
[58] Field of Search .................... 198/302, 318, 861.5, 198/860.3, 860.1, 632, 698, 699.1, 728, 731, 816, 735; 414/334

[56] References Cited

U.S. PATENT DOCUMENTS

| | | | |
|---|---|---|---|
| 2,808,924 | 10/1959 | Wood | 198/816 |
| 2,875,888 | 3/1959 | Swain et al. | 198/816 |
| 3,053,372 | 9/1962 | Gallagher | 198/302 |
| 3,118,315 | 1/1964 | Loosli | 198/816 |
| 3,206,003 | 9/1965 | Orr | 198/861.1 X |
| 3,605,994 | 9/1971 | Parlette | 198/861.1 X |
| 3,752,298 | 8/1973 | Wenger | 198/816 |
| 3,881,594 | 5/1975 | Jepson | 198/841 X |
| 3,921,793 | 11/1975 | Hutchinson et al. | 198/816 X |
| 3,944,054 | 3/1976 | Ensinger | 198/861.1 X |
| 4,650,067 | 3/1987 | Brule | 198/841 |

Primary Examiner—Robert J. Spar
Assistant Examiner—D. Glenn Dayoan
Attorney, Agent, or Firm—Browdy and Neimark

[57] ABSTRACT

The present invention relates to a compact portable conveyor for truck use, in particular, the conveyor body is provided with flat and smooth support surfaces for supporting the transmitted articles as well as for providing the transmitted articles, hard or soft, a slide moving surface for easy delivery also on both the top and bottom ends of the conveyor body, there are provided an adjustment plate for tightening adjustment of the driving chains which are wound on the sprockets of the driving shafts as they are mounted to their respective adjustment plates. Furthermore, the driving chains are provided with evenly distributed latitudinal pushing boards. The fore section of the conveyor body is provided with a support footing for conveying height adjustment, and the resilience of an U-shaped bracing strip at the ground end of the support footing is utilized for locking the support footing on the two sides of the conveyor body, when not used, for storage purposes.

2 Claims, 4 Drawing Sheets

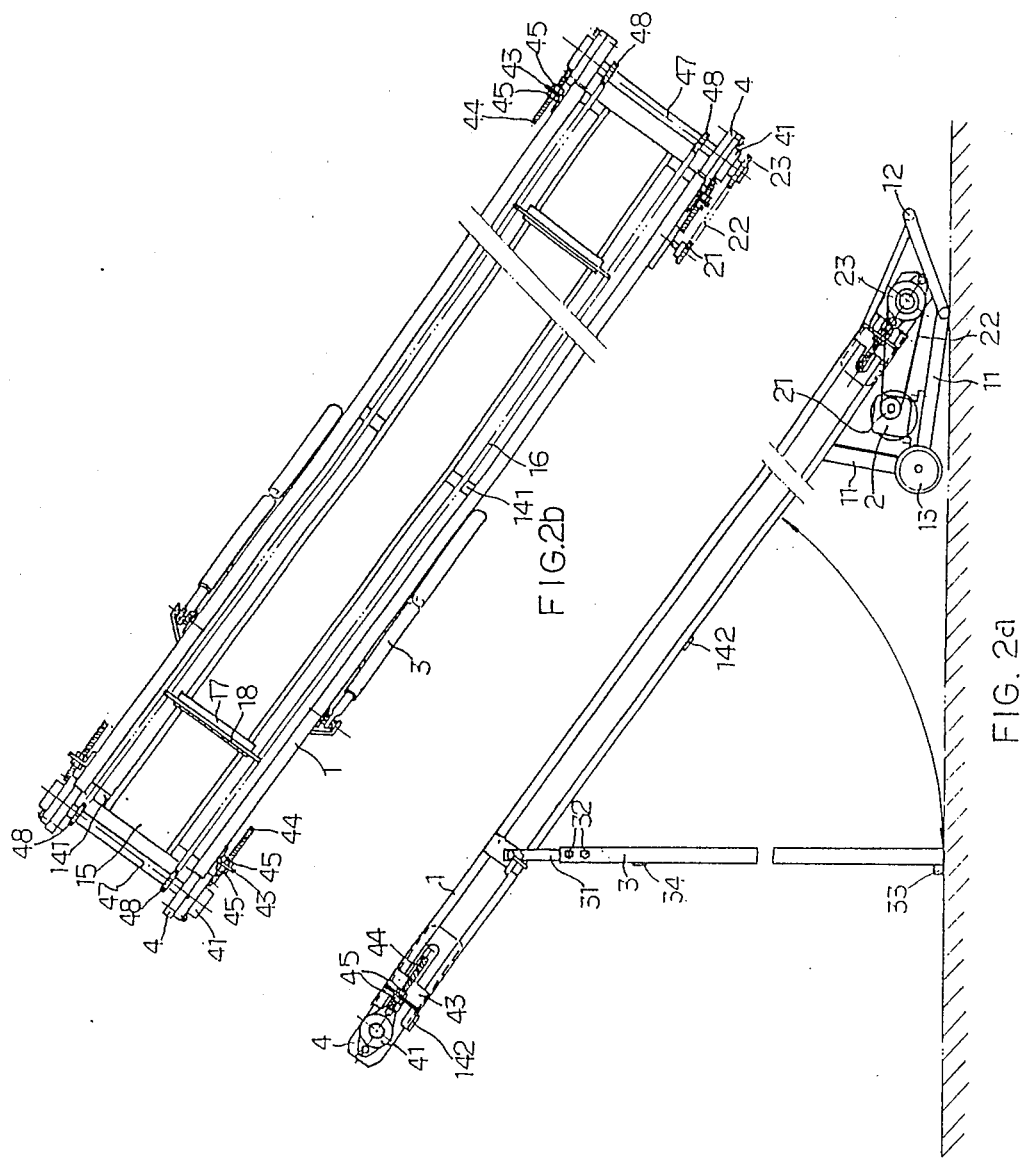

COMPACT PORTABLE CONVEYOR

BACKGROUND OF THE INVENTION

The present invention relates to a portable conveyor for loading and unloading products from delivery trucks.

In the delivery of general agricultural products or commodities, nowadays, conveyors are widely utilized at the production locations for loading them on delivery trucks for saving both time and labor, but these types of conveyor are generally huge in size and heavy in weight, and can not be readily carried to go by the same delivery truck to a terminal location for unloading the loads therefrom. Therefore, labor is required for unloading them when the truck arrives at the terminal location, which creates uneconomical and time consuming problems.

Conveyors for serving the above mentioned purposes are categorized into two types, and their shortcomings are described as follows:

1. Belt type conveyors.

As shown in FIG. 1A, this type of conveyor utilizes an elongated cycling, reinforced rubber belt by winding it around the front and rear end of driving rollers with a plurality of idle rollers disposed therebetween for supporting the conveyor belt, but this only increases the bulk weight of the whole conveyor to a large extent. Since the conveyor belt is made of synthetic fiber and rubber, it becomes loosely engaged due to fatigue, this in turn causes slip or poor frictional contact between the belt and the rollers surfaces, and finally resulting in the whole conveyor not functioning.

2. Flat board or thin rod type conveyors.

As shown in FIG. 1B, this type of conveyor utilizes two longitudinal parallel endless driving chains, one chain at each side, and between each pair of corresponding chain segments thereof, there are provided with multiple latitudinal flat boards or rods, as they are uniformly distributed along these two chains. Furthermore, multiple idle rollers must be provided to support the boards or rods, otherwise, the conveying surface inbetween these two driving chains will become downward curved on loading.

From the above description, it can be seen that both types of conveyors are huge in size and heavy in weight, and lack of mobility to be carried along by a truck for serving loading and unloading purpose at any locations.

SUMMARY OF THE INVENTION

In order to eliminate the above mentioned shortcomings, the inventor, using his cumulated conveyor manufacturing experiences for a long time, devised a conveyor which is simple in construction, light in weight as well as small in size, and particularly can be carried along by a truck for serving loading and unloading purpose at any location to save time and cost.

BRIEF DESCRIPTION OF THE DRAWINGS

The main object of the present invention is to improve the conventional conveyor for loading and unloading products on trucks, by simplifying the structure thereof to make it more convenient to operate and more mobile to carry along with a truck without affecting its original function.

The invention itself, however, both as to its construction and its method of operation, together with additional objects and advantages thereof, will be best understood from the following description of embodiment example when read in connection with the accompanying drawings.

FIG. 2A is the side view of the conveyor of the present invention.

FIG. 2B is the top view of the conveyor of the present invention.

DETAILED DESCRIPTION OF THE PREFERRED EMBODIMENT

Figure 1A:
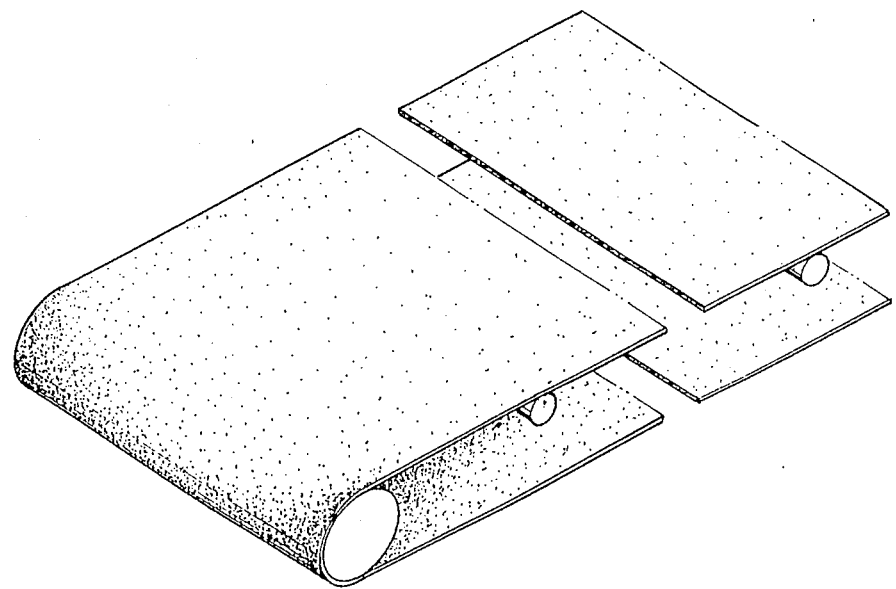
FIG. 1A shows the traditional belt type conveyors.
Figure 1B:
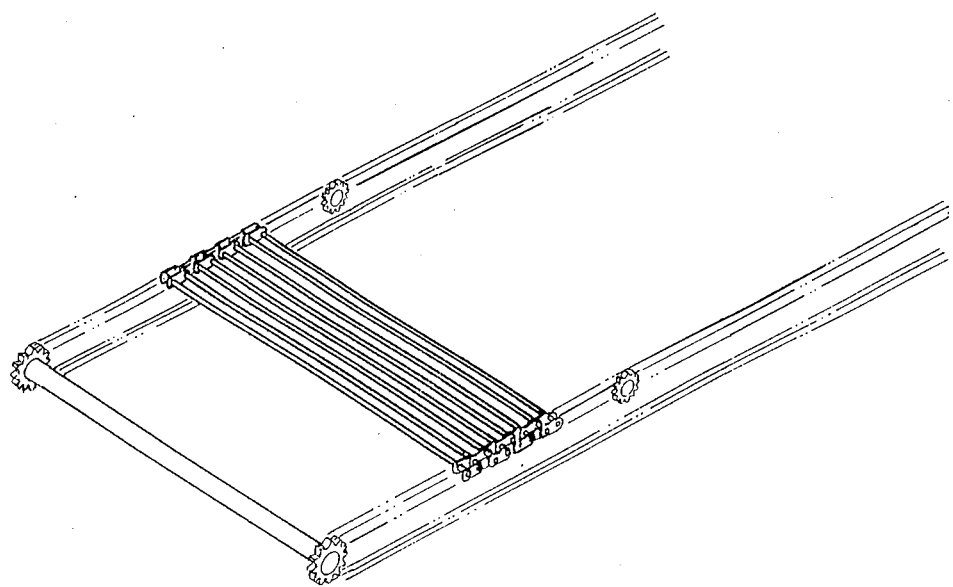
FIG. 1B shows the traditional flat board or thin rod type conveyors.
Figure 3:
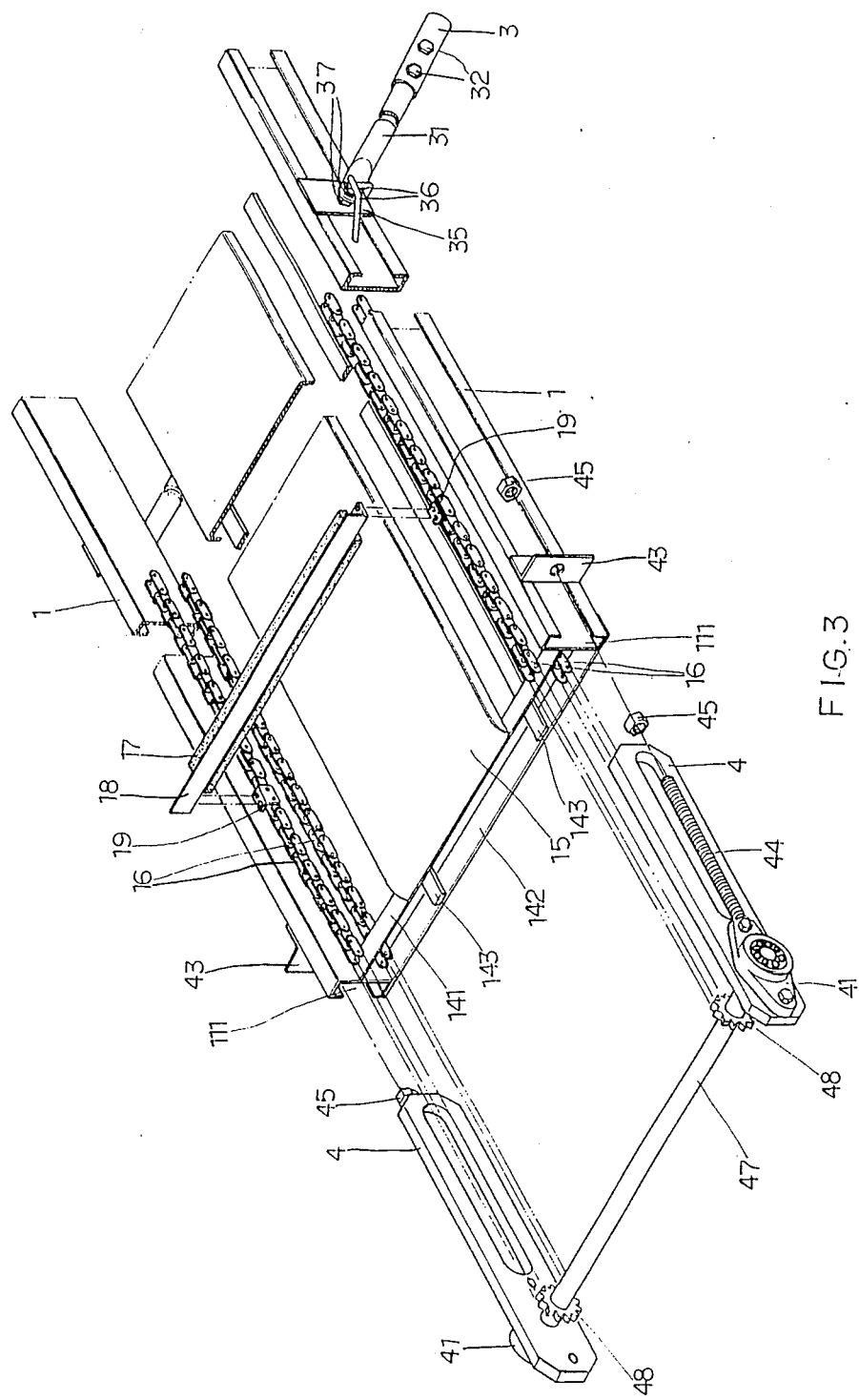
FIG. 3 is the exposed perspective top view of the conveyor of the present invention.

As shown in FIGS. 2A, 2B and 3, the conveyor body comprises two back-to-back placed C-shaped longitudinal steel or aluminium channels 1 which are joined together by an upper and lower latitudinal bracing strips 141, 142,. On the upper latitudinal bracing strips 141, inverted U-shaped support boards 15 are provided which have a flat and smooth surface for supporting the transmitted articles as well as for providing these articles, no matter whether the articles are hard or soft, consisting of a sliding moving surface for easy transmission. On the lower latitudinal bracing strips 142, two longitudinal support strips 143 are welded thereto, one at each side parallel to the two longitudinal channels 1 for further supporting the support boards 15 when they are bent downward due to heavy load. At the ground end of the conveyer body, a motor mounting seat 11 is provided, which is utilized for fixing a speed reducing driving motor 2. On the motor mounting seat 11, two casters are provided. Also at the same ground end of the conveyer, a stop rack 12 is provided for preventing the articles being conveyed from falling to the ground.

The driving unit for the conveyor comprises two separate driving sections. The upper driving section is located on the top end of the conveyor body, and the lower driving section is located on the ground end thereof, both of which are provided with adjustment plates 4, as they are inserted into the corresponding troughs 111 of the two channels 1. Each adjustment plate 4 is provided with a bearing seat 41 whereby a bearing is mounted, and utilized for the reception of one of the ends of the driving shaft 47 which is provided with two sprockets 48, one at each side, with the two conveying endless chains 16 wound respectively thereon. On each bearing seat 41 an adjustment screw bolt 44 is attached by welding, which is mounted on the conveyor body 1 by two nuts 45 via an L-shaped adjustment seat 43, so that the adjustment plates 4 can be adjusted along the troughs 111 for properly tightening the two conveying chains 16. Multiple evenly distributed latitudinal pushing boards 18 are provided for conveying articles by pushing force. Each pushing board 18 is fixed on the two conveying chains 16 by screws at its two ends via respective L-shaped assembling seats 19. Also on the bottom side of each pushing board 18, a rubber cushion 17 is provided, which prevents the pushing board 18 from rubbing against the support boards.

Figure 4:
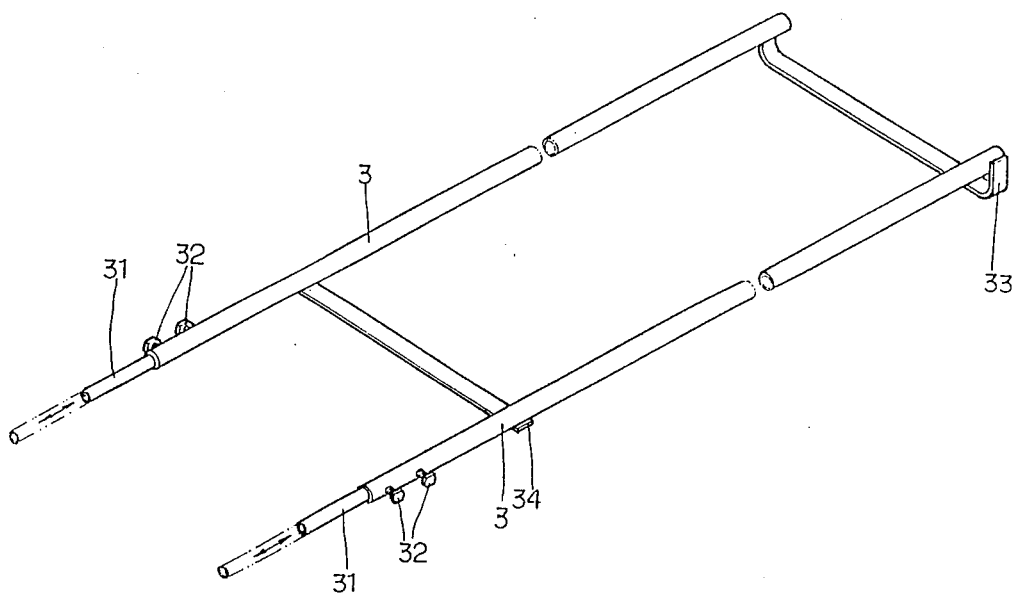
FIG. 4 is the perspective view of the support footing for the conveyor of the present invention.

As shown in FIG. 4, the support footing comprises two pairs of telescoped inner and outer tubes 3, 31. Each inner tube 31 can move freely along its respective outer tubes 3 that are provided with locking screws 32 to lock up their respective inner tubes 31 for effecting the conveyor height adjustment.

Figure 5:
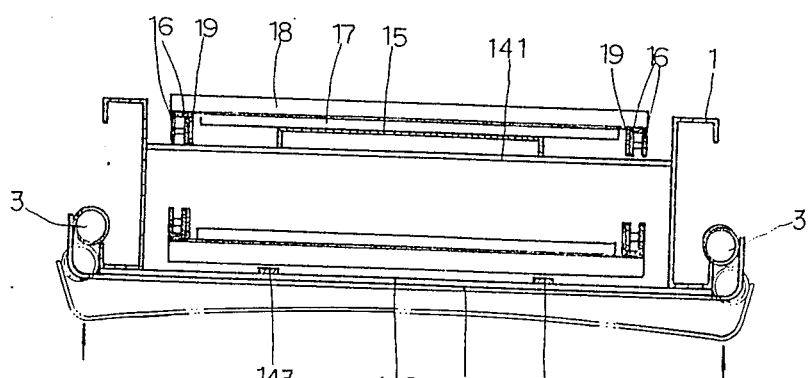
FIG. 5 is the illustrative diagram of the present invention, which shows how the support footing of the conveyor is folded up for storage.

The top ends of the two inner tubes 31 are mounted on the respective sides at the fore section of the conveyor body by nuts 37 via respective side plates 35 and L-shaped steel rods 36. In this manner, the support points will not become deformed when subjected to forces from any direction. At the ground end of the support footing, the two outer tubes are tied up together by an U-shaped resilient bracing strip 33 with its U-shaped trough facing the conveyor body 1, so that the distance between the two outer tubes at the same end is slightly smaller than the latitudinal distance between the two channels 1 of the conveyor body. As shown in FIG. 5, when the support footing is folded up until it reaches the conveyor body, a pushing force is required to make the two outer tubes 3 become widely open to be engaged on the rims of the two channels. When the supporting footing is to be utilized, a pulling force must be applied to the two outer tubes 3 to permit them to disengage therefrom. 9n

What I claim is:

1. A compact portable conveyor for truck use, which comprises:

a conveyor body consisting of two spaced back-to-back C-shaped longitudinal steel or aluminium channels, upper and lower latitudinal bracing strips for joining together said two longitudinal channels, said upper latitudinal bracing strips being provided with an inverted U-shaped support board having a flat and smooth support surface, said lower latitudinal bracing strips being provided by welding with two longituidnal support strips, one at each side parallel to said two longitudinal channels, the ground end of the conveyor body being provided with a motor mounting seat for fixing a speed reduced driving motor, two casters being provided on said motor mounting seat, the fore section of the conveyor body being provided with a height adjustable support footing;

said support footing comprising two pairs of telescoped inner tubes and outer tubes, said inner tubes being movable freely along their respective outer tubes and said outer tubes being provided with locking screws for locking their respective inner tubes in place, the top ends of said inner tubes of the support footing being mounted on the respective sides of said conveyor body at the fore section, the ground end of said outer tubes of the support footing being connected together by a resilient U-shaped latitudinal bracing strip with its U-shaped trough facing the conveyor body, the distance between the two outer tubes at the ground end of said support footing being slightly smaller than the latitudinal distance between said two longitudinal channels of the conveyor body;

a driving unit comprising an upper section and a lower section, said upper and lower sectors being provided with adjustment plates which are inserted into the respective troughs of said two longitudinal channels of the conveyor body, each of said adjustment plates are provided with a bearing and a bearing seat, said bearings being utilized for receiving driving shafts which are provided with sprockets, and driving chains are wound on said sprockets each said bearing seat being provided, by welding, with a screw bolt which is utilized for tightness adjustment of the driving chains by taking said conveyor body as its support point, the driving chains being provided with evenly distributed latitudinal pushing boards for conveying articles by pushing forces, whereby a height adjustable, portable conveyor is constructed which is adapted to be carried by a truck for loading and unloading articles at any location.

2. A portable conveyor for truck use as set forth in claim 1, wherein the length of said support footing can be extended or shortened for height adjustment of said conveyor; a resilient U-shaped latitudinal bracing strip is provided on the two outer tubes at the ground end of the support footing, wherein when said support footing is folded up until its outer tubes at the ground end reach the two respective outer sides of the conveyor body, then a larger pushing force is applied to make the same engage the rims of said channels, and said bracing strip is resilient to allow said two outer tubes to be opened wider, and as the conveyor is to be utilized, a pulling force is applied to the two outer tubes of said support footing to permit the same to disengage therefrom.

* * * * *